United States Patent
Andresen et al.

(10) Patent No.: US 7,274,817 B2
(45) Date of Patent: *Sep. 25, 2007

(54) CONVERSION OF OUTPUT DEVICE COLOR VALUES TO MINIMIZE IMAGE QUALITY ARTIFACTS

(75) Inventors: Kevin W. Andresen, Campbell, CA (US); Kok S. Chen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 10/406,248

(22) Filed: Apr. 4, 2003

(65) Prior Publication Data

US 2003/0189715 A1 Oct. 9, 2003

Related U.S. Application Data

(63) Continuation of application No. 08/475,023, filed on Jun. 6, 1995, now Pat. No. 6,571,011.

(51) Int. Cl.
*G06K 9/00* (2006.01)
*G03F 3/08* (2006.01)
*G09G 5/02* (2006.01)

(52) U.S. Cl. .................. 382/167; 358/520; 345/604

(58) Field of Classification Search ............. 382/167, 382/168, 162; 358/520, 501, 518, 505, 512, 358/515; 345/604

See application file for complete search history.

(56) References Cited

U.S. PATENT DOCUMENTS

| 4,992,862 | A | * | 2/1991 | Gabor ..................... 358/518 |
| 5,042,078 | A | | 8/1991 | Oshikoshi et al. ......... 382/167 |
| 5,185,661 | A | * | 2/1993 | Ng ........................ 358/505 |
| 5,485,278 | A | * | 1/1996 | Nakajima ................ 358/296 |
| 5,539,540 | A | | 7/1996 | Spaulding et al. ......... 358/518 |
| 5,553,160 | A | * | 9/1996 | Dawson ................... 382/166 |
| 5,742,296 | A | * | 4/1998 | Yamada et al. ............ 345/604 |
| 5,764,807 | A | * | 6/1998 | Pearlman et al. ......... 382/240 |

* cited by examiner

*Primary Examiner*—Wenpeng Chen
(74) *Attorney, Agent, or Firm*—Buchanan Ingersoll & Rooney PC

(57) ABSTRACT

Undesirable artifacts appearing in color images, such as blooming or smudging around the edges of text, are avoided through selective reduction of the color gamut for objects which form the image. Individual component color values are modified by taking into account combinations of colors and their effect upon the artifacts to be eliminated. Only those parameter values which contribute to the artifact are modified. Other parameter values are left intact, to maintain the original image characteristics. When a color value is modified, all components of that color are modified in a symmetrical manner, to preserve the hue of the original color. The impact on the image is further minimized by selectively applying color correction only to those objects in which the artifact is pronounced.

36 Claims, 2 Drawing Sheets

CONVERSION OF OUTPUT DEVICE COLOR VALUES TO MINIMIZE IMAGE QUALITY ARTIFACTS

This application is a continuation of application Ser. No. 08/475,023, filed on Jun. 6, 1995 now U.S. Pat. No. 6,571,011.

FIELD OF THE INVENTION

The present invention is directed to color imaging systems, and more particularly to the minimization of undesirable artifacts, such as smudging and blooming that appear when images containing highly saturated colors are reproduced.

BACKGROUND OF THE INVENTION

Color output devices for color imaging systems, such as color printers, typically represent colors within the context of a device color space. A color space reflects the particular characteristics of the manner in which a device produces a color image. For example, a CRT monitor utilizes red, blue and green phosphors to generate an image, and thereby operates within a red-green-blue (RGB) color space. In contrast, a color printer may utilize cyan, magenta, and yellow inks or toners to generate images, and thereby operates within a cyan-magenta-yellow (CMY) color space.

The gamut of an imaging device is defined as the full range of colors that the device can reliably reproduce within its color space. In practice, a device's gamut is limited by characteristics of the methods that the device uses to produce colors, and is almost always a subset of the visible spectrum. For example, most color laser printers cannot reproduce saturated colors as bright as those which appear on a computer monitor. In some devices, there are colors which are visible in the device gamut but which produce undesirable artifacts. Typically, these artifacts occur at the boundaries of the device gamut, e.g. in areas of high saturation. For example, a color laser printer may represent 100% blue as a combination of 100% cyan toner and 100% magenta toner, where the percentage refers to the saturation, or intensity, of the toner that is placed on the paper. When such high saturation values are called for, the result may "smudge" or "bloom" at the edges of the objects.

Blooming is one particular example of a phenomenon that becomes pronounced when objects are printed with highly saturated secondary or tertiary colors. In a printer that operates with a CMY color space, for example, the secondary colors of concern are red, blue and green, which are each formed by combining two of the component colors, cyan, magenta and yellow. It has been observed that, when two primary colors are successively deposited in an area of an image to produce a secondary color, the latter one of the two primary colors to be deposited ends up covering an area larger than the actual area of the object. For example, red text is generated by depositing magenta toner and then yellow toner. When the resulting image is examined, the yellow toner forms a "halo" around the edges of the character which produces a smudged appearance. In addition, the actual color of the character may have an orangish hue, rather than being red.

In the past, various methods have been employed to limit and/or modify the gamut of an imaging device, in an effort to reduce these artifacts. For example, a tonal reproduction curve (TRC) is commonly used to redistribute the nominal color space within a device gamut. These curves basically comprise transfer functions that are individually applied to the different color components of the device's color space. For example, in a CMY printer, a nominal color value (c,m,y) is adjusted by the toner reproduction curve to generate an adjusted color value (c',m',y'). The computation of each adjusted component of the color value is a function of only its own nominal color value component. In other words, c' is a function of c, m' is a function of m, and y' is a function of y. As such, tonal reproduction curves cannot be used to correct for artifacts which result from combinations of color components.

A simple approach that has been used to restrict the gamut of an image device is to reduce all color values by a global modification factor. For example, in a CMY printer where at least 90% of the gamut is artifact-free, a modified color value (c',m',y') can be computed from a nominal color value (c,m,y) as:

$c'=0.9c$
$m'=0.9m$
$y'=0.9y$

This method results in a restriction of the entire device gamut, including areas were restriction may not be necessary. In addition, it causes every color to be modified, even those which were originally within the artifact-free portion of the gamut.

Another method that has been employed in the past is to clip values which lie outside of the artifact-free portion of the gamut, i.e., to limit them to a maximum value. For example, in a CMY printer where the maximum cyan, magenta and yellow values in the artifact-free portion of the gamut are represented as cmax, mmax and ymax, the modifying color value (c',m',y') is computed from the nominal color value (c,m,y) as:

$c'=\min(c,cmax)$
$m'=\min(m,mmax)$
$y'=\min(y,ymax)$

This approach also results in undesirable visual side effects. For example, if cmax is 95% cyan, all cyan values in the nominal device space which are greater than 95% cyan are forced to the single value of 95% cyan in the artifact-free device space. Thus, in an image having a gradient in which cyan progresses from 0% to 100%, the clipping of all cyan values greater than 95% will be readily apparent in the image.

It is desirable, therefore, to provide a method by which device-dependent image quality artifacts can be reduced or eliminated without adversely affecting the quality of images resulting therefrom.

SUMMARY OF THE INVENTION

In accordance with the present invention, the various components of a device's color space are modified in combination with other components to provide an artifact-free gamut. For example, in a CMY printer, each of the components of an artifact-free color value (c',m',y'), are computed as functions of their corresponding color component and the other color components in a nominal color value (c,m,y). With this approach, the modification of the color gamut is carried out with consideration of the manner in which the color components interact with one another. As such, its applicability is not limited to the reduction or limitation of artifacts that are due solely to device primary colors. Rather, artifacts such as blooming which result from saturated secondary and tertiary colors can also be corrected.

As a second feature of the invention, consideration is given to the hue of the nominal color value when converting to an artifact-free color value. If the reduction of color values to bring them within an artifact-free portion of the gamut is not symmetrical with respect to each color component, an undesirable shift in hue can occur. In accordance with a second feature of the invention, the ratios between components in the modified color are adjusted to maintain the same relative ratios as in the nominal color value, to avoid shifts in hue.

In accordance with a third aspect of the invention, the range of nominal color values which are modified is limited to those which produce artifacts. For example, saturation-related artifacts typically appear only when the saturation value of the nominal color is above a particular threshold value. In accordance with the third aspect of the invention, all nominal color values below this threshold are unmodified, i.e., the adjusted color value is the same as the original color value. For nominal color values greater than the threshold, the nominal color values are mapped to adjusted color values in a manner that provides a smooth transition within a range near the edge of the artifact-free gamut, so that all nominal color values above the threshold can be mapped to artifact-free adjusted color values.

As a fourth feature of the invention, the adjustment of color values to eliminate artifacts is limited to objects which are most susceptible to the artifacts. For example, blooming is most pronounced with small objects, such as text characters having a small point size and fine lines. As a further feature of the invention, a determination is first made whether an object in an image is one which is susceptible to the artifact of interest. If not, no modification of its color values takes place. If, however, the object is one in which the effects of the artifact are pronounced, its color value is modified.

These features can be combined, as desired, to eliminate or compensate for image generation phenomena which produce undesirable artifacts, in a manner which does not degrade the overall quality of the final image. Further features of the invention, as well as the advantages attained thereby, are explained in detail hereinafter with reference to a preferred embodiment illustrated in the accompanying drawings.

DETAILED DESCRIPTION

To facilitate an understanding of the present invention, it is described hereinafter in the context of a specific embodiment. In particular, reference is made to the elimination of blooming in a color printer which employs a CMY color space to represent colors. It will be appreciated, however, that the practical applications of the invention are not limited to this particular example. Rather, the invention can be applied in any type of image-generating device in which undesirable artifacts in an image can be avoided by changing the color gamut of the device. Thus, for example, the invention is equally applicable to video display monitors and LCD panels.

Figure 1:
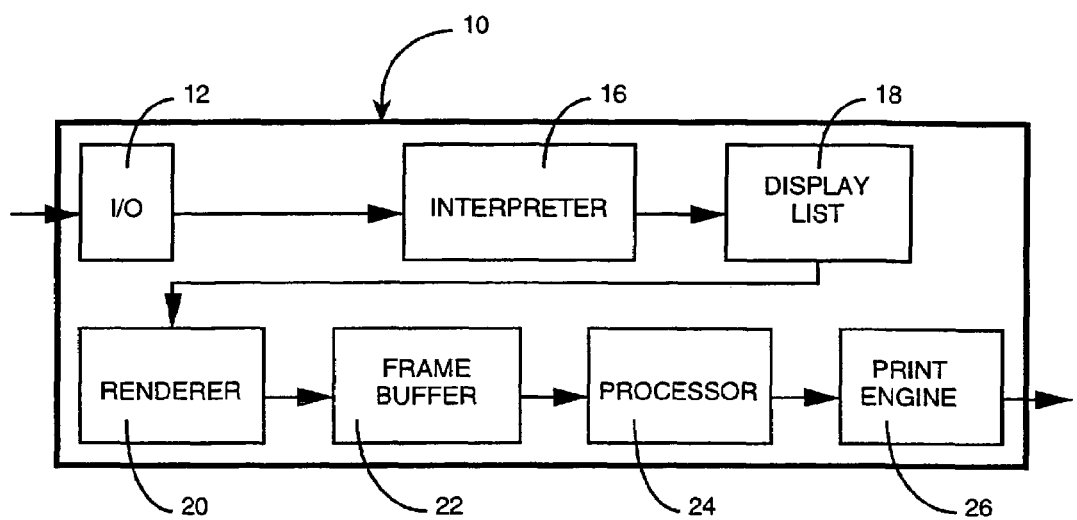
FIG. 1 is a block diagram illustrating the major components of a printer in which the principles of the present invention can be implemented.

FIG. 1 depicts the major components of a color printer in which the present invention can be employed. The printer can include an I/O controller 12 connected to one or more I/O ports for communication with computers and other external sources of data to be printed. Image data received from external sources is provided to an interpreter 16, which issues calls in response to the received data that cause the desired image to be drawn, or printed, on the paper. These calls can be of two basic types. One set of calls identifies the appearance state of objects to be drawn. This appearance state indicates the color of the object as well as other appearance-related factors, such as patterns or the like. The other set of calls describes the objects themselves, such as a rectangle, a line, a particular character of text, or the like. In the example of FIG. 1, these calls are stored in an intermediate form, known as a display list 18, or a metafile.

The information on the display list 18 is provided to a renderer 20. The renderer converts the object-based information from the interpreter 16 into individual pixel display values, which are stored in a frame buffer 22. The pixel display values stored in the frame buffer can undergo optional processing within one or more processors 24. For example, the display values can be compressed and/or decompressed, or undergo halftone processing. Ultimately, these display values are supplied to a print engine 26, to control the actual printing of the desired image. The print engine might be of the laser beam type or an ink jet type.

The process of the present invention takes place within the interpreter 16, as the calls are being generated and stored on the display list 18. Basically, the calls which relate to the appearance states of objects are examined to determine whether they identify a particular appearance state that results in an artifact of concern. For example, "blooming" is one such artifact. In accordance with the present invention, appearance state calls generated by the interpreter are examined to determine whether the color to be printed is one which results in blooming, e.g., highly saturated red, blue or green. If so, the color value is adjusted to bring it within the portion of the printer's color gamut that is free of blooming. If, however, the color being requested is not one which is susceptible to blooming, e.g., a primary color, no such modification is carried out.

As a first feature of the invention, the modification of a color value to eliminate undesirable artifacts is a function of not only individual color value components, but combinations of those components as well. Generally, the modification of a nominal color value (c,m,y) to produce an artifact-free color value (c',m',y') in accordance with the invention can be expressed as follows:

$$c' = f_c(c) + f_{cm}(c,m) + f_{cy}(c,y)$$

$$m' = f_m(m) + f_{mc}(m,c) + f_{my}(m,y)$$

$$y' = f_y(y) + f_{yc}(y,c) + f_{ym}(y,m)$$

More generally, for a color space that comprises N components, the artifact-free color values are computed as functions of combinations of components, where the number of components is less than N. Typically, the functions of two or more components, e.g. $f_{ij}$ in the equations given above, return zero or negative values to reduce each color component of interest in accordance with the values of the other components which make up a nominal color, as explained in detail below.

Figures 2, 3:
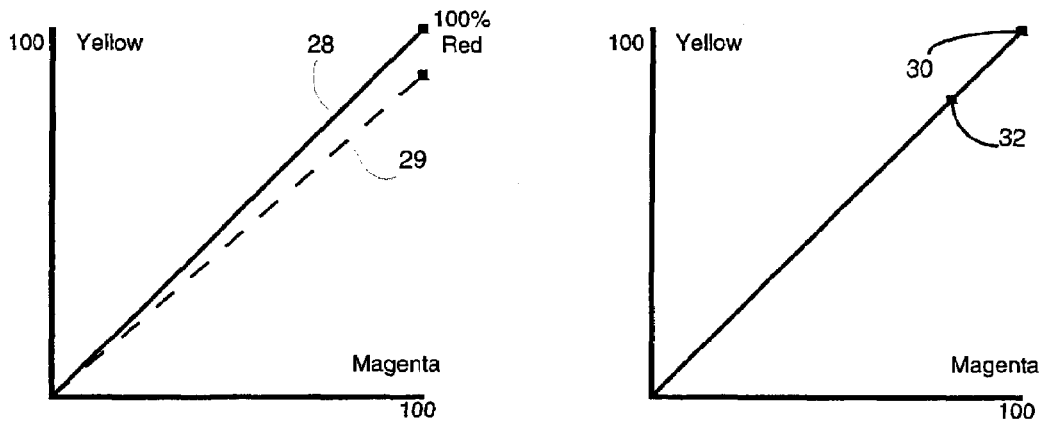
FIG. 2 is a graph illustrating a first approach to the reduction of artifacts.
FIG. 3 is a graph illustrating a second approach to the reduction of artifacts.

In a simple approach to the elimination of blooming, it is possible to reduce the saturation value of only the color component which causes the blooming effect. Thus, in the example given above, if yellow is the color component which contributes to blooming, the value of the yellow component in a nominal color can be reduced. Referring to FIG. 2, red is generated in a CMY printer with equal amounts of magenta and yellow. Thus, 50% red comprises 50% yellow and 50% magenta, whereas 100% red is made of up 100% magenta and 100% yellow, as indicated by the solid line 28. To reduce the effects of blooming at high saturation levels, it is possible to decrease the saturation of the yellow component. For example, the yellow component can be reduced to a maximum of 85%. This case is indicated by the dashed line 29 in FIG. 2. While this modification reduces blooming, it has the undesirable effect of shifting the hue of the color. More particularly, colors disposed along the dashed line have a higher magenta component than yellow component. At higher saturation levels, this difference in hue can be quite noticeable.

In accordance with a second aspect of the invention, the hue of a color is preserved when converting from the nominal color value to an artifact-free color value. In the example of FIG. 2, the shift in hue results from the non-symmetry of the modification that is made. More particularly, the yellow component is reduced by a greater amount than the magenta component. In accordance with the present invention, the original hue of the nominal color value is preserved by maintaining the ratio between the components in the modified color value. Thus, in the example given above, the yellow and magenta components have equal values in the nominal color. Accordingly, when modifying a nominal color value to eliminate artifacts, all of the components are modified in a manner which maintains their original relationship. Referring to FIG. 3, the nominal color value may designate the point 30 in the color space, which represents 100% yellow and 100% magenta. If the yellow component is reduced by 15% to eliminate blooming, the magenta component is reduced by a proportionate amount. In this example, the magenta component is also reduced by 15%. The resulting value is designated by the point 32, which lies on the original line 28, and thereby preserves the hue of the nominal color.

A modification such as that depicted in FIG. 3 can be effected in a simple manner by multiplying each color component by a suitable modification factor, e.g., 85%. However, this approach results in an unnecessary modification of nominal color values that are already present within the artifact-free portion of the color gamut. For example, a call for 50% red would be modified to result in a value which is 42.5% magenta and 42.5% yellow, i.e., 42.5% red. If 50% red does not cause a blooming problem, there is no need to reduce its value, and thereby alter the ultimate image.

Figure 4:
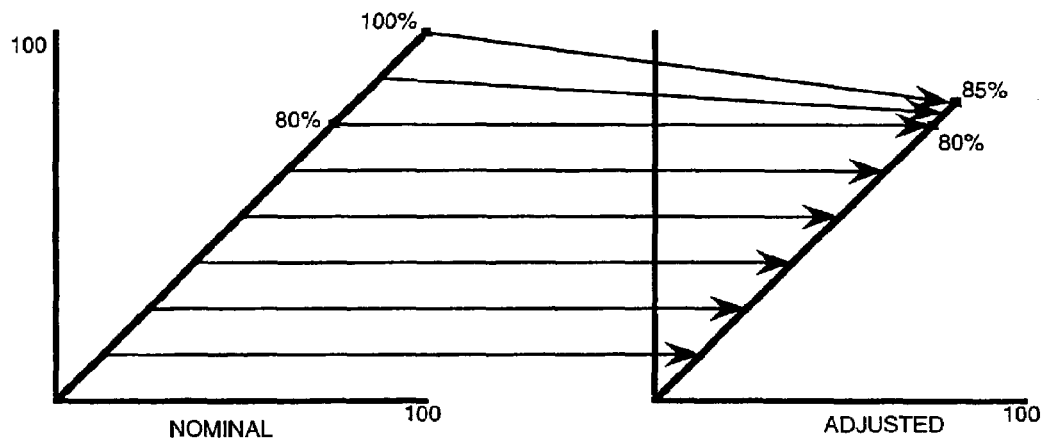
FIG. 4 is a graph illustrating the preferred approach of the present invention.

In accordance with a third aspect of the invention, the portion of the gamut which is modified to eliminate artifacts is limited, so that only those color values which result in artifacts are modified. For example, blooming of the color red may not occur for red saturation values below 85%. As such, there is no need to modify those values. In the implementation of the present invention, a value somewhat less than the blooming threshold value is chosen as the limit for color value compensation, to provide a smooth transition to the end of the artifact-free portion of the color gamut. For example, if the blooming threshold for red is 85% saturation, a value of 80% saturation can be chosen for the compensation limit. In this case, a color value which is 80% or less remains unmodified. For secondary and tertiary color values in the range of 80% to 100%, modification is effected to eliminate blooming. More particularly, nominal color values in the nominal range of 80% to 100% are mapped into the artifact-free range between 80% and 85%, as depicted in FIG. 4. The mapping of the nominal values into the modified value range can be effected in a number of different manners. Preferably, the mapping is carried out with a function that produces a smooth transition between the limit value and the artifact threshold value. For example, linear, logarithmic and higher order functions can be employed to compress the color values in the nominal range of 80% to 100% into the artifact-free range from 80% to 85%.

In some cases, certain undesirable artifacts may only be noticeable in certain situations. For example, blooming is most prevalent with small text, e.g., 12 point characters or smaller, and fine lines, e.g., widths of 2 points or less. In these situations, it is desirable to modify the nominal color values to eliminate the artifact. In other types of images, though, the modification which results in a reduction of saturation values may not be desirable. For example, in an image such as a scanned photograph which contains a number of colors disbursed throughout, the saturation values for the colors should be as high as possible, to maintain image quality. In such a case, modification to reduce artifacts may be undesirable.

In accordance with another feature of the present invention, the objects which form an image to be generated are examined to determine whether they present the types of conditions where it is desirable to reduce artifacts. Thus, as calls are being issued by the interpreter 16, they can be examined to determine whether they designate a type of object whose color values should be modified to eliminate the artifact. For example, if a call specifies a photographic image or a geometric object, no modification needs to be applied. If, however, the designated object is a character of text or a line, it is further examined to determine whether its size falls into the category where the artifact is of concern.

Figure 5:
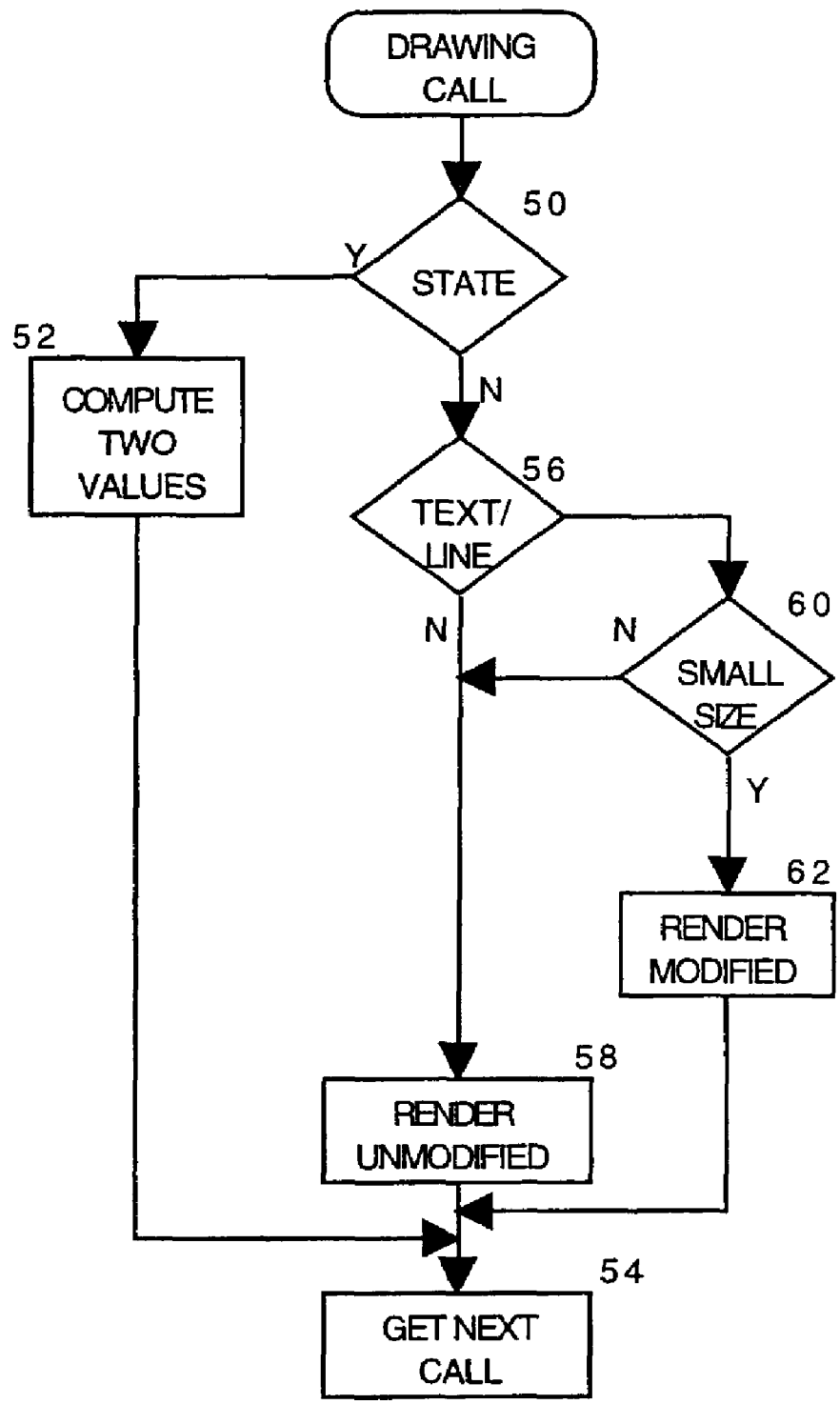
FIG. 5 is a flowchart illustrating the process of reducing artifacts in accordance with the present invention.

FIG. 5 is a flowchart which represents the process carried out by the present invention to minimize saturation artifacts. As entries are retrieved from the display list 18 during the rendering process, they are first examined at Step 50 to determine whether they designate an appearance state or an object. If the call pertains to an appearance state, a pair of color values are computed at Step 52. One value is an unmodified value for the color or other appearance-related parameter, based on the nominal color which is called for. The other color value is one which is modified in accordance with the principles described above to eliminate an artifact. The next display list entry is then retrieved at Step 54.

If a retrieved entry pertains to an object, a determination is made at Step 56 whether the object is the type of object that is susceptible to the artifact of concern. In the example given previously, if the artifact is blooming, such objects include characters and lines of text. One system for separately identifying text and other types of objects in image data is disclosed in U.S. Pat. No. 5,276,531, the disclosure of which is incorporated herein by reference. If the designated object does not fall into the category of concern, the object is rendered, using the unmodified color at Step 58. If, however, the designated object is of the type to which color correction is applicable, a further determination is made at Step 60 whether the particular object meets the criteria for color correction. In the case of text and lines, this step involves a determination whether the size of the object is below a predetermined limit value, e.g., 12 point for text and 2 point for lines. If not, the object is rendered, using the unmodified color, at Step 58. If, however, the object is one that falls within the designated criteria, it is rendered using the modified color, at Step 62.

In the preferred embodiment of the invention, this process is implemented with the use of a look-up table which is indexed by nominal color values and outputs modified color values. In a CMY printer, for example, the look-up table is formulated by first determining the equivalent red-green-blue component values for a given nominal CMY color. The maximum modification for each of the red, green and blue values to eliminate the artifact is determined, and all three of the values are proportionally modified by the maximum. For red, green and blue values that lie below a color correction limit, the nominal values map to the same values in the modified output. All values greater than the color correction limit are compressed into a space that is free of artifacts, as described in connection with FIG. 4.

From the foregoing, it can be seen that the present invention provides a technique for avoiding blooming and similar types of artifacts, while maintaining the hue of the resulting image. Furthermore, to minimize the impact of the color correction on the image, only those values near the saturated areas of the device's gamut are modified, to reduce the artifact, and thereby minimize the overall impact on the image.

It will be appreciated by those of ordinary skill in the art that the present invention can be embodied in other specific forms without departing from the spirit or essential characteristics thereof. For example, the invention is equally applicable to all types of color output devices, such as video monitors and LCD screens, and is not limited to any particular color spaces. The presently disclosed embodiments are considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A computer-readable medium comprising a computer program for minimizing color-induced artifacts in images that are represented in an N-component color space, the computer program performs the steps of:

detecting whether a nominal color for one or more objects in an image is comprised of plural components, wherein at least one of said components has a parameter that exceeds a predetermined value;

determining a modified value for said parameter of the one component, which is a function of the value for said parameter for M components which comprise said nominal color, where 1<M<N, to produce an adjusted color; and generating an image in accordance with the adjusted color.

2. The computer-readable medium of claim 1 wherein the computer program performs the step of modifying said parameter values for each of said components in a manner such that the ratio of color components in the adjusted color is the same as the ratio of color components in said nominal color.

3. The computer-readable medium of claim 1 wherein the computer program performs the step of determining a limit value for said parameter, modifying values of said parameter for colors whose components have a parameter value greater than said limit, and maintaining the values of said parameter for colors whose components have a parameter value less than said limit to be the same as the parameter values for the nominal color, to produce an adjusted color.

4. The computer-readable medium of claim 1 wherein the computer program performs the step of determining whether an object of said nominal color in said image is of a predetermined type, and selectively modifying parameter values to produce adjusted color values in dependence upon whether said object is of said predetermined type.

5. The computer-readable medium of claim 4 wherein said predetermined type includes text characters and lines.

6. The computer-readable medium of claim 5 wherein the computer program performs the step of selectively modifying parameter values in dependence upon the sizes of objects which are of said predetermined type.

7. The computer-readable medium of claim 1 wherein said parameter is the saturation value of a color component.

8. A computer-readable medium comprising a computer program for minimizing color-induced artifacts in images, the computer program performs the steps of:

detecting whether a nominal color for one or more objects in an image contains at least one color component having a saturation value that exceeds a predetermined value;

modifying saturation values for all color components of said nominal color in a proportional manner to reduce the saturation value of said one color component below said predetermined value and thereby produce an adjusted color having a hue which is the same as the hue of said nominal color; and generating an image in accordance with the adjusted color.

9. The computer-readable medium of claim 8 wherein the computer program performs the step of determining a limit saturation value, modifying saturation values for colors whose components have a saturation value greater than said limit, and maintaining the saturation values for colors whose components have a saturation value less than said limit to be the same as the saturation values for the nominal color, to produce an adjusted color.

10. The computer medium of claim 8 wherein the computer program performs the step of determining whether an object of said nominal color in said image is of a predetermined type, and selectively generating the image in accordance with said adjusted color values in dependence upon whether the object is of said predetermined type.

11. The computer-readable medium of claim 10 wherein said predetermined type includes text characters and lines.

12. The computer-readable medium of claim 8 wherein the computer program performs the step of selectively modifying saturation values for the generated image in dependence upon the sizes of objects which are of said predetermined type.

13. A computer-readable medium comprising a computer program for minimizing color-induced artifacts in images, the computer program performs the steps of:

examining image data which includes information that identifies nominal colors for objects in an image;

establishing a threshold value and a limit value less than said threshold value for a given parameter of the nominal colors;

producing adjusted color values for nominal colors which have parameter values that lie in a range from said limit value to said threshold value and beyond, by reducing said values for said given parameter to values that lie within a range from said limit value to said threshold value, and by maintaining parameter values less than said limit value the same as those for the nominal colors; and generating an image in accordance with said adjusted color values.

14. The computer-readable medium of claim 13 wherein the computer program performs the step of determining whether an object identified by said image data is of a predetermined type, and selectively generating an image in accordance with said adjusted color values in dependence upon whether the object is of said predetermined type.

15. The computer-readable medium of claim 14 wherein said predetermined type includes text characters and lines.

16. The computer-readable medium of claim 13 wherein the computer program performs the step of selectively modifying parameter values for the generated image in dependence upon the sizes of objects which are of said predetermined type.

17. The computer-readable medium of claim 13 wherein said parameter is the saturation value of a color component.

18. A computer-readable medium comprising a computer program for minimizing color-induced artifacts in images, the computer program performs the steps of:

determining whether an object in an image is one of a predetermined category of objects;

producing an adjusted color value for an object which is one of said predetermined category of objects by modifying parameter values for color components which are greater than a predetermined limit value;

selectively modifying parameter values for the generated image in dependence upon the sizes of objects which are of said predetermined type; and generating an image in accordance with said adjusted color value.

19. The computer-readable medium of claim 18 wherein said predetermined type includes text characters and lines.

20. The computer-readable medium of claim 18 wherein said parameter is the saturation value of a color component.

21. A method for minimizing color-induced artifacts in an image comprising:

determining whether a color value produces artifacts based on a saturation value of the color value;

modifying the color value, wherein the color value is modified as a function of individual color components of the color value and combinations of the individual color components of the color value, and the color components of the modified color value maintain a same ratio as the color components in the color value; and limiting use of the modified color value to objects of a predetermined type.

22. The method of claim 21, wherein the color value produces artifacts if the saturation value is above a predetermined threshold value.

23. The method of claim 21, wherein the predetermined type includes text characters and lines.

24. The method of claim 21, wherein the objects of the predetermined type are reproduced by a printer.

25. The method of claim 21, wherein the objects of the predetermined type are reproduced by a video monitor.

26. The method of claim 21, wherein the objects of the predetermined type are reproduced by an LCD panel.

27. A system comprising:

means for detecting whether a nominal color for one or more objects in an image is comprised of plural components, wherein at least one of said components has a parameter that exceeds a predetermined value;

means for determining a modified value for said parameter of the one component, which is a function of the value for said parameter for M components which comprise said nominal color, where $1<M<N$, to produce an adjusted color; and means for generating an image in accordance with the adjusted color.

28. The system of claim 27, wherein the means for generating the image is a print engine.

29. The system of claim 27, wherein the means for generating the image is a video monitor.

30. The system of claim 27, wherein the means for generating the image is an LCD panel.

31. A method of minimizing color-induced artifacts of objects in images comprising:

determining component color values of a nominal color value pertaining to an object meeting an image size limit;

determining a maximum modification value of each color component; proportionally modifying only the color components exceeding a color correction limit value based on the maximum modification value for the respective color component to produce a modified nominal color value; and repeating the determination of component color values, the determination of the maximum modification value and the proportional modifying for a plurality of nominal color values to generate a table for use in reproducing images.

32. The method of claim 31, wherein the modified nominal color value is the same as the nominal color value if each of the color components is less than the maximum modification value.

33. A method of minimizing color-induced artifacts of objects in images comprising:

receiving image data;

determining, for a nominal color reproducible using color components and pertaining to an object in the image data meeting an image size limit, a modified nominal color using a table by proportionally modifying only the color components exceeding a color correction limit value based on a maximum modification value for the respective color component to produce a modified nominal color; and reproducing an image using the modified nominal color for the color components exceeding the color correction limit value.

34. The method of claim 33, wherein the nominal color is the same as the modified nominal color if the color components of the nominal color are below the color correction limit.

35. The method of claim 34, wherein if the color components of the nominal color are above the color correction limit, the color components of the modified nominal color are compressed into a color space free of artifacts.

36. The method of claim 33, wherein the determining step is repeated for each nominal color in the image data.

* * * * *